United States Patent [19]
Kiefer et al.

[11] Patent Number: 5,063,700
[45] Date of Patent: Nov. 12, 1991

[54] FISH BAIT AND LURE ILLUMINATOR

[76] Inventors: David L. Kiefer, 1535 Voorhees, Manhattan Beach, Calif. 90266; Leon S. Milhon, 12332 Allin St., Culver City, Calif. 90230

[21] Appl. No.: 501,235
[22] Filed: Mar. 29, 1990
[51] Int. Cl.$^5$ ............................................. A01K 85/00
[52] U.S. Cl. ...................................... 43/17.6; 43/17.5
[58] Field of Search ........................ 43/17.1, 17.5, 17.6

[56] References Cited

U.S. PATENT DOCUMENTS

| 3,828,177 | 8/1974 | Day ......................................... 43/17.6 |
| 4,250,650 | 2/1981 | Fima ........................................ 43/17.6 |
| 4,347,681 | 9/1982 | Fima ........................................ 43/17.6 |
| 4,617,751 | 10/1986 | Johansson ............................... 43/44.98 |
| 4,621,447 | 11/1986 | Rhodes .................................... 43/17.6 |
| 4,799,327 | 1/1989 | Treon ...................................... 43/17.6 |

Primary Examiner—Richard K. Seidel
Assistant Examiner—Chuck Y. Man

[57] ABSTRACT

A fish bait and lure illuminator is comprised of a watertight housing containing an electrical battery and a bulb which provides a source of illumination in the housing. An optical fiber extends into the housing and has its inner end close to the light source. Light is conducted through the optical fiber out of the housing, through the length of optical fiber with little or no attenuation. The external end of the fiber optic acts as a lens to give off light similar in intensity to the source of illumination to illuminate the living, non-living bait or artificial lure.

3 Claims, 1 Drawing Sheet

FISH BAIT AND LURE ILLUMINATOR

FIELD OF THE INVENTION

This invention relates in general to the illumination of bait or lures for attracting fish to hooks. More particularly, the invention pertains to self contained, submersible source of illumination that provides illumination from a remote illumination source to the bait or lure through a length of fiber optic.

DISCUSSION OF PRIOR ART

It is well known to skilled fishermen that fish are attracted to light, movement, smell, and sound. Hence, live bait, non-living bait, and artificial lures have been employed to attract fish. The principle difficulty with any bait or artificial lure is the need for ambient light to make the bait or lure visible to the fish. Consequently, the ability to attract fish varies in effectiveness with ambient light conditions and the clarity of the water. To avoid reliance on the reflection of ambient light from bait, non-living bait or artificial lures, self-illuminating devices have been used.

Prior art for self illuminating live bait, non-living bait, and lures have generally employed a miniature light bulb and an electric battery to generate the illumination. To protect the battery and bulb, these elements are usually enclosed in a water tight housing. To illuminate live and non-living bait, generally the light emerges from the housing through a lens of plastic or glass thereby requiring the apparatus to be mounted on the fishing line or leader in very close proximity to the bait thereby interfering with the normal appearance of the bait or lure. In some instances, wires leading from the housing containing the battery to the light bulb or LED have been employed in an attempt to make the flashlight like apparatus more remote so as to not interfere with the normal appearance of the bait.

Artificial lures have generally employed an electric battery and miniture light bulb contained within the body of the lure. To protect the battery and bulb, those elements are enclosed in a water tight housing. To permit the light to emerge from the housing, the housing may be transparent or translucent. Where an opaque housing is used, it is provided with a window and may employ a lens to cause the light to emerge as a beam. Bundles of fiber optics have also been employed to transport the light from the internal light source to the exterior surface of the lure. Even in instances where the bundle of fiber optics exits the housing, the fiber optics constitute part of the lure and provides pin points of light along an elongated body comprising part of the lure.

Many of the prior art self illuminating lures have a flashing light to simulate the normal changes in the reflectance of light that results when live bait moves through water.

BRIEF DESCRIPTION OF THE INVENTION

The invention resides in a self contained electrically powered light source to illuminate live bait, non-living bait, and artificial lures through a length of optical fiber. The bait or lure is illuminated by the spot of light given off at the end of the optical fiber. Artificial lures are illuminated either internally by inserting the fiber optic into a receiving orifice in the lure and allowing the light to emerge through a reflective, transparent or translucent surface, or externally by causing the light to be reflected from the external lure surface.

OBJECT AND ADVANTAGES OF THE INVENTION

The object and advantages of the present invention are:

a) provide illumination of living bait, non-living bait or artificial lure to attract fish.

b) provide illumination for the bait or lure while maintaining a natural appearance of the bait or lure.

THE DRAWINGS

The invention, both as to its arrangement and mode of operation, can be better understood from the written description which follows when it is considered in conjunction with the accompanying drawings in which.

| Reference Numbers In Drawings | |
|---|---|
| 1 | Housing |
| 2 | Cavity |
| 3 | Battery |
| 3A | Second Battery |
| 4 | Pressure Switch |
| 5 | Light Bulb |
| 6 | Fiber Optic |
| 7 | Hole for Fiber Optic |
| 8 | Cap |
| 8A | Threaded Nipple |
| 9 | O-ring |
| 10 | Leader |
| 11 | Hook for Bait |
| 12 | Center Conductor |
| 13 | Helical Spring |
| 14 | Leaf Spring |
| 15 | Leader Attach Device |
| 16 | Not Used |
| 17 | Artificial Lure |
| 18 | Fish Hook on Lure |
| 19 | Orifice for Fiber Optic |
| 20 | Fish Line |
| 21 | Split Ring |
| 22 | Second Split Ring |

DESCRIPTION OF THE INVENTION

Figure 1:
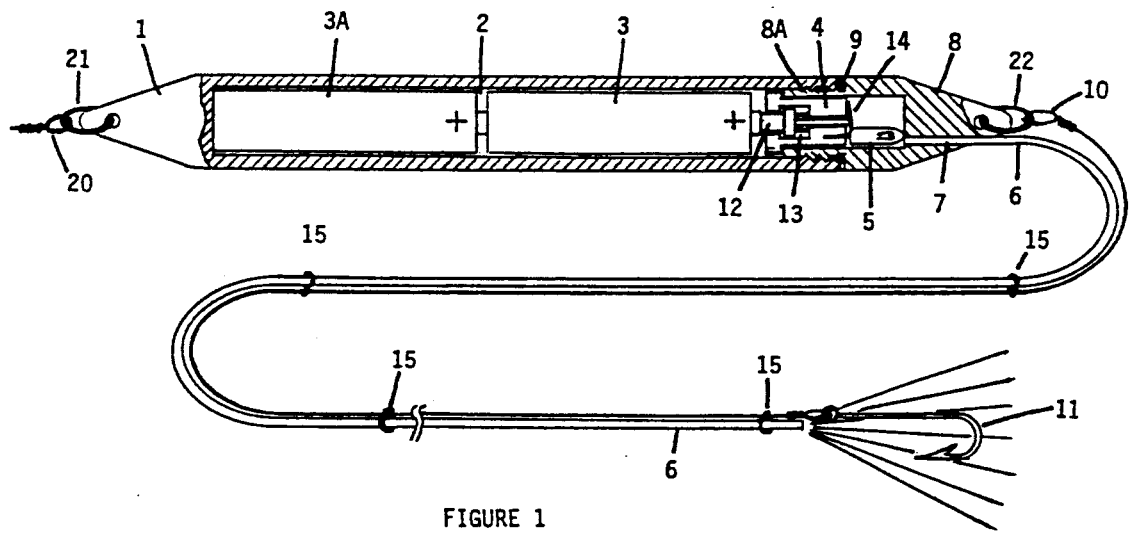
FIG. 1 is a crossectional representation of the preferred embodiment of the invention in assembled form providing a view of the interior arrangement of the parts of the housing and cap, and the fiber optic along with a representation for live and non-living bait to be illuminated by the fiber optic.
Figure 2:
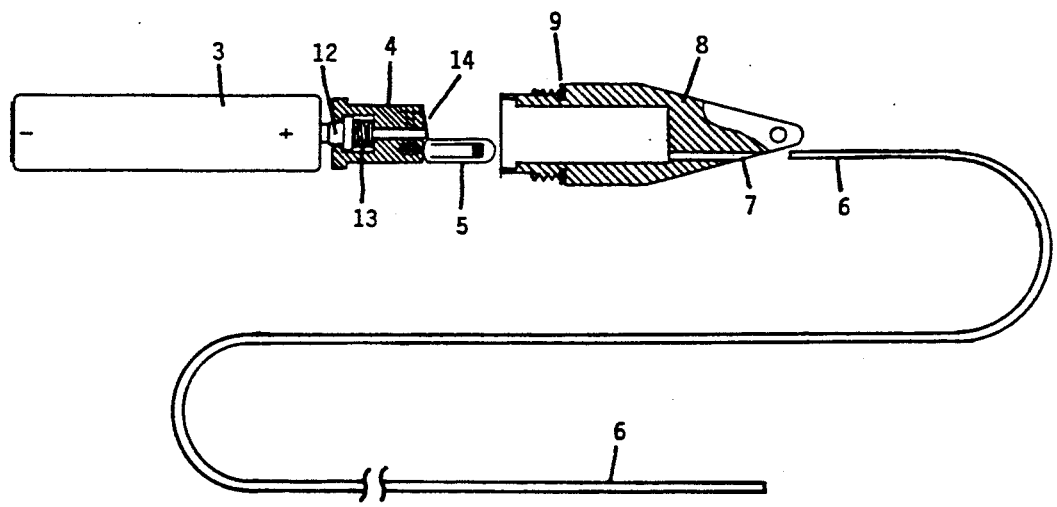
FIG. 2 is an exploded view of the embodiment depicted in FIG. 1 which shows details of the switch employed in FIG. 1.

Referring to the assemblage shown in FIG. 1 and to the exploded view of FIG. 2, the embodiment of the invention is shown which employs an opague cylinderical housing 1 having a central chamber 2 in which an electric battery 3 or batteries 3 and 3A are received. The housing has a hole near the pointed end through which a split ring 21 is attached. The split ring 21 attaches to fishing line 20.

A cap 8 is provided with threaded nipple 8A to engage mating threads in the interior of the housing 1 whereby the open end of the chamber 2 can be closed off by screwing the cap and the housing together. An o-ring 9 is situated between the cap and the housing to make a watertight seal when the cap is tightened against the housing.

The cap contains a mechanical pressure switch 4 that is activated by the positive post of battery 3 as the cap is tightened against the housing. The tightening of the cap causes the center conductor 12 of the switch 4 to contact a metalic leaf spring 14 located on top of the switch body 4. The leaf spring 14 provides the positive contact for the miniature light bulb 5. Therefore, when the center conductor of the switch 12 contacts the leaf spring 14 the electrical circuit is closed and the battery engergizes the light bulb to cause the bulb to emitt light. When the cap is partially unscrewed, a helical spring 13 contained within the body of the switch causes the switch center conductor 12 to break contact with the leaf spring 14 so that current cannot flow and the light bulb is turned off.

To conduct light generated by the bulb 5 to the outside of the housing, an optical fiber 6 passes through a hole 7 in the cap parallel to the center line of the cap. The fiber optic is cemented or epoxyed to the cap to create a waterproof seal.

Figure 3:
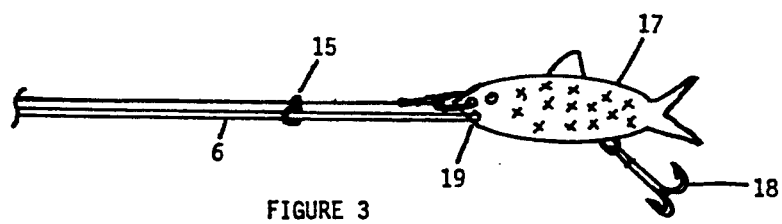
FIG. 3 depicts an artificial lure as one of the objects to be illuminated by the fiber optic.

As is well known, the fiber optic 6 acts as a light transmission conduit so that light entering one end of the fiber propagates through the conduit to emerge at the other end of the fiber substantially unattenuated. The normal cut end of the fiber optic 6 acts as a lens to spread the beam of emergent light from the fiber optic 6 to illuminate live bait or non-living bait attached to fishhook 11 or atificial lures 17 FIG. 3, either externally or if the lure is transparent or translucent, then from the inside by inserting the fiber optic into an orifice 19 in the body of the lure 17.

Inasmuch as none or very little of the light escapes through the side wall of the fiber, only the exposed end of the fiber is visibly illuminated. Thus the exposed end of the fiber has the aspect of providing illumination in a manner similar to the energized source of light. The aspect presented by the exposed end of the fiber optic can be altered to suit the occassion. For example, the end may be shaped to disperse light more rapidly if the fiber is plugged into a transparent or translucent artificial lure.

The inner end of the fiber optic 6 is in close proximity to the light bulb. The end of the fiber may even be arranged to rest directly on the glass envelope of the light bulb. The point where the fiber optic exits the cap is near a hole in the cap to which a split ring 22 is attached. Attached to this split ring is a length of fishing leader that is the same length as the fiber optic. At several points along this leader are small attachment devices 15 to tie the leader to the fiber optic 6 such that the illuminated exposed end of the fiber optic will be maintained in close proximity to the live or non-living bait or the articficial lure to ensure its illumination.

The housing can be made to be buoyant to float upon the surface of the water or can be made heavier so that it sinks below the surface. The weight can be adjusted by attaching "sinkers" to the housing or to the fishing line in the manner common in the art of fishing.

The aspect presented by the fiber optic can be altered to suit the occasion. For example, the clear fiber optic can be enclosed in a dark or opaque sheath to prevent any light from escaping from the length of fiber optic except from the illuminating end. The length of the fiber optic can also be adjusted to move the housing closer or farther away from the bait to be illuminated. The illuminated end can also be cut at varying angles and shapes to disperse the illuminating light more rapidly and/or in different patterns.

If flashing illumination is wanted instead of continuous light, a miniature flashing bulb can be employed. This type of bulb is similar to those used in battery powered Christmas decorations. The bulb contains a bi-metalic thermal switch built into the light which causes the light to be intermittenly turned off and on.

Because the invention can be embodied in a variety of structures, it is not intended that the invention be limited to the precise forms illustrated or describes herein. Rather, it is intended that the invention be delimited by the appended claims and include only thos structures that utilize the invention.

What we claim is:

1. In a bait or lure illuminating apparatus of the type having:
    an elongated waterproof housing having an enclosed chamber,
    an electrical battery situated in the chamber,
    a light source situated in the chamber,
    a means for completing an electrical circuit between the battery and the light source; the improvement comprising:
    a. an optical fiber extending through the housing at one end thereof, the interior end of the optical fiber being mounted in the housing in close proximity to the light source, the optical fiber external to the housing being of sufficient length to provide remote illumination so as to provide the aspect that the housing is not in the vicinity of the bait or lure;
    b. a fishing leader attached to the housing and a hook that holds the bait or lure wherein the length of optical fiber is attached at several points along and near the end of said fishing leader such that the exterior end of the optical fiber acts as a lens to provide illumination of the bait or lure; and
    c. means for securing a fishing line to the other end of said housing.

2. The improvement according to claim 1, further comprising:
    the external end of the fiber optic extends past the end of the leader and is inserted into an orifice in a translucent or transparent artificial lure to provide a source of illumination such that the transparent or translucent lure has the aspect of being a glowing or lighted body.

3. The improvement according to claim 1, further comprising:
    an optical fiber enclosed in a opaque sheath to prevent any light from escaping from the lenth of optical fiber except at the end that acts as a lens.

* * * * *